US010492268B2

(12) United States Patent
Potucek

(10) Patent No.: US 10,492,268 B2
(45) Date of Patent: Nov. 26, 2019

(54) LOCAL FEATURE CONTROLLER FOR POOL AND SPA EQUIPMENT

(71) Applicant: Hayward Industries, Inc., Elizabeth, NJ (US)

(72) Inventor: Kevin Potucek, Far Hills, NJ (US)

(73) Assignee: Hayward Industries, Inc., Elizabeth, NJ (US)

( * ) Notice: Subject to any disclaimer, the term of this patent is extended or adjusted under 35 U.S.C. 154(b) by 200 days.

(21) Appl. No.: 14/204,352

(22) Filed: Mar. 11, 2014

(65) Prior Publication Data

US 2014/0277777 A1 Sep. 18, 2014

Related U.S. Application Data

(60) Provisional application No. 61/780,114, filed on Mar. 13, 2013.

(51) Int. Cl.

| | |
|---|---|
| ***H05B 37/02*** | (2006.01) |
| ***A61H 33/02*** | (2006.01) |
| ***E04H 4/12*** | (2006.01) |
| ***E04H 4/14*** | (2006.01) |
| ***A61H 33/00*** | (2006.01) |

(Continued)

(52) U.S. Cl.

CPC ............. *H05B 37/02* (2013.01); *A61H 33/60* (2013.01); *E04H 4/1209* (2013.01); *E04H 4/148* (2013.01); *A61H 33/0087* (2013.01); *A61H 33/02* (2013.01); *A61H 2033/0079* (2013.01); *A61H 2033/0083* (2013.01);

(Continued)

(58) Field of Classification Search

CPC .................... H05B 37/02; A61H 33/60; A61H 2033/0079; A61H 33/02; A61H 2201/5012; A61H 2201/5043; A61H 2201/5097; A61H 33/0087; A61H 2033/0083; E04H 4/148; E04H 4/1209

USPC .................................. 700/286, 65, 275, 282

See application file for complete search history.

(56) References Cited

U.S. PATENT DOCUMENTS 4,780,917 A * 11/1988 Hancock ............... A61H 33/02 4/541.2
4,920,465 A 4/1990 Sargent
(Continued)

OTHER PUBLICATIONS

International Search Report dated Aug. 28, 2014, issued in connection with International Application No. PCT/US14/23312 (5 pages).
(Continued)

*Primary Examiner* — Michael J Brown
(74) *Attorney, Agent, or Firm* — McCarter & English, LLP

(57) ABSTRACT

A local feature controller for pool and spa equipment is provided. The local feature controller can be pre-programmed to selectively control operation of devices near the local feature controller, namely, a valve actuator, water fountain, pool light, landscaping light, etc. The local feature controller can operate autonomously, or under the control of the central controller. The local feature controller could include a liquid crystal display (LCD) and associated user input keys for allowing a user to interact with and control the controller. The local feature controller could be buried underground, and it could be powered by one or more local power sources, namely, a rechargeable battery, line-level (AC) power, a solar panel, or a liquid turbine installed inline with a return line from the pool's filtration system.

35 Claims, 9 Drawing Sheets

(51) Int. Cl.
*G05B 15/02* (2006.01)
*G05B 15/00* (2006.01)
*G05D 1/00* (2006.01)

(52) U.S. Cl.
CPC ................ *A61H 2201/5012* (2013.01); *A61H 2201/5043* (2013.01); *A61H 2201/5097* (2013.01)

(56) References Cited

U.S. PATENT DOCUMENTS

| | | | | | |
|---|---|---|---|---|---|
| 5,435,031 | A * | 7/1995 | Minami | E04H 4/1654 | 15/1.7 |
| 6,080,927 | A * | 6/2000 | Johnson | F24J 2/07 | 126/562 |
| 6,782,309 | B2 | 8/2004 | Laflamme | | |
| 7,482,764 | B2 * | 1/2009 | Morgan | F21V 33/004 | 315/291 |
| 8,649,908 | B2 * | 2/2014 | Nibler | G05B 15/02 | 700/19 |
| 9,392,711 | B2 * | 7/2016 | Potucek | H05K 5/061 | |
| 2002/0070611 | A1 * | 6/2002 | Cline | A61H 33/005 | 307/149 |
| 2005/0088119 | A1 * | 4/2005 | Potucek | H05B 37/029 | 315/312 |
| 2007/0233420 | A1 | 10/2007 | Potucek et al. | | |
| 2008/0039977 | A1 * | 2/2008 | Clark | G05D 23/1905 | 700/282 |
| 2008/0251602 | A1 * | 10/2008 | Leggett | A01G 25/167 | 239/69 |
| 2010/0274408 | A1 * | 10/2010 | Stiles, Jr. | G06Q 10/06 | 700/296 |
| 2012/0222997 | A1 | 9/2012 | Potucek et al. | | |
| 2013/0129536 | A1 * | 5/2013 | Robol | F04B 19/00 | 417/410.1 |
| 2014/0250580 | A1 * | 9/2014 | Magyar | F04D 15/00 | 4/494 |

OTHER PUBLICATIONS

Written Opinion of the International Searching Authority dated Aug. 28, 2014, issued in connection with International Application No. PCT/US14/23312 (6 pages).

Invitation to Pay Additional Fees dated Jun. 19, 2014, issued in connection with International Application No. PCT/US14/23312 (2 pages).

International Preliminary Report on Patentability, dated Sep. 24, 2015, issued in connection with International Application No. PCT/US2014/023312 (8 pages).

* cited by examiner

LOCAL FEATURE CONTROLLER FOR POOL AND SPA EQUIPMENT

RELATED APPLICATIONS

This application claims the priority of U.S. Provisional Application Ser. No. 61/780,114 filed Mar. 13, 2013, the disclosure of which is expressly incorporated herein by reference in its entirety.

BACKGROUND

Technical Field

The present disclosure relates to control equipment for pools and spas. More specifically, the present disclosure relates to a local feature controller for pool and spa equipment.

Related Art

In the pool/spa field, there are often many devices which are required for proper maintenance and functionality of a pool or spa. Examples of such equipment include pumps, filters, heaters, chlorinators, and other equipment. There are also other types of equipment of a more aesthetic nature, such as underwater pool lighting.

Often, a central controller is provided for controlling the aforementioned equipment. Such a controller is in electrical communication with each piece of equipment to be controlled, and is frequently installed at the equipment location (sometimes referred to as the equipment "pad"). Each piece of equipment to be controlled is usually hardwired to the central controller by way of control and/or power cables (and/or wires). Due to electrical code and safety requirements, such cables and/or wires must be installed in conduits, which are often buried in the ground. Also, there is significant time, labor, and costs associated with having to install fluid conduits (pipes) from each water feature in a pool/spa to the system's pump/filter. As such, cable/wire and/or conduit runs represent a significant expense to the pool owner, and it would be desirable to limit such expense by reducing and/or eliminating the costs associated with same.

SUMMARY

The present disclosure relates to a local feature controller for pool and spa equipment. The local feature controller can be pre-programmed to selectively control operation of a device near the local feature controller, such as a valve actuator, water fountain, pool light, landscaping light, etc. The local feature controller can operate autonomously, or under the control of a central controller. The local feature controller could include a liquid crystal display (LCD) and associated user input keys for allowing a user to interact with and control the controller. The local feature controller could be buried underground, and it could be powered by one or more local power sources such as a rechargeable battery, line-level (AC) power, a solar panel, or a liquid turbine installed inline with a return line from the pool's filtration system. The local feature controller reduces time, labor, and costs associated with having to install conduits and/or cables from each water and/or lighting feature back to a pool/spa equipment pad.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a local feature controller for pool and spa equipment, as discussed in detail below in connection with FIGS. 1-9. By the term "local," it is meant a location near a piece of equipment to be controlled, such as an underwater light, a water fountain, a valve actuator, a landscaping light, etc. Additionally, by the term "feature," it is meant a water feature (e.g., a fountain, aerator, return jet, etc.), a lighting feature (e.g., an underwater pool or spa light, a landscaping light near a pool or spa, a light associated with a water feature, etc.), or any other controllable aspect of a pool or spa, such as chlorination equipment, etc.

Figure 1:
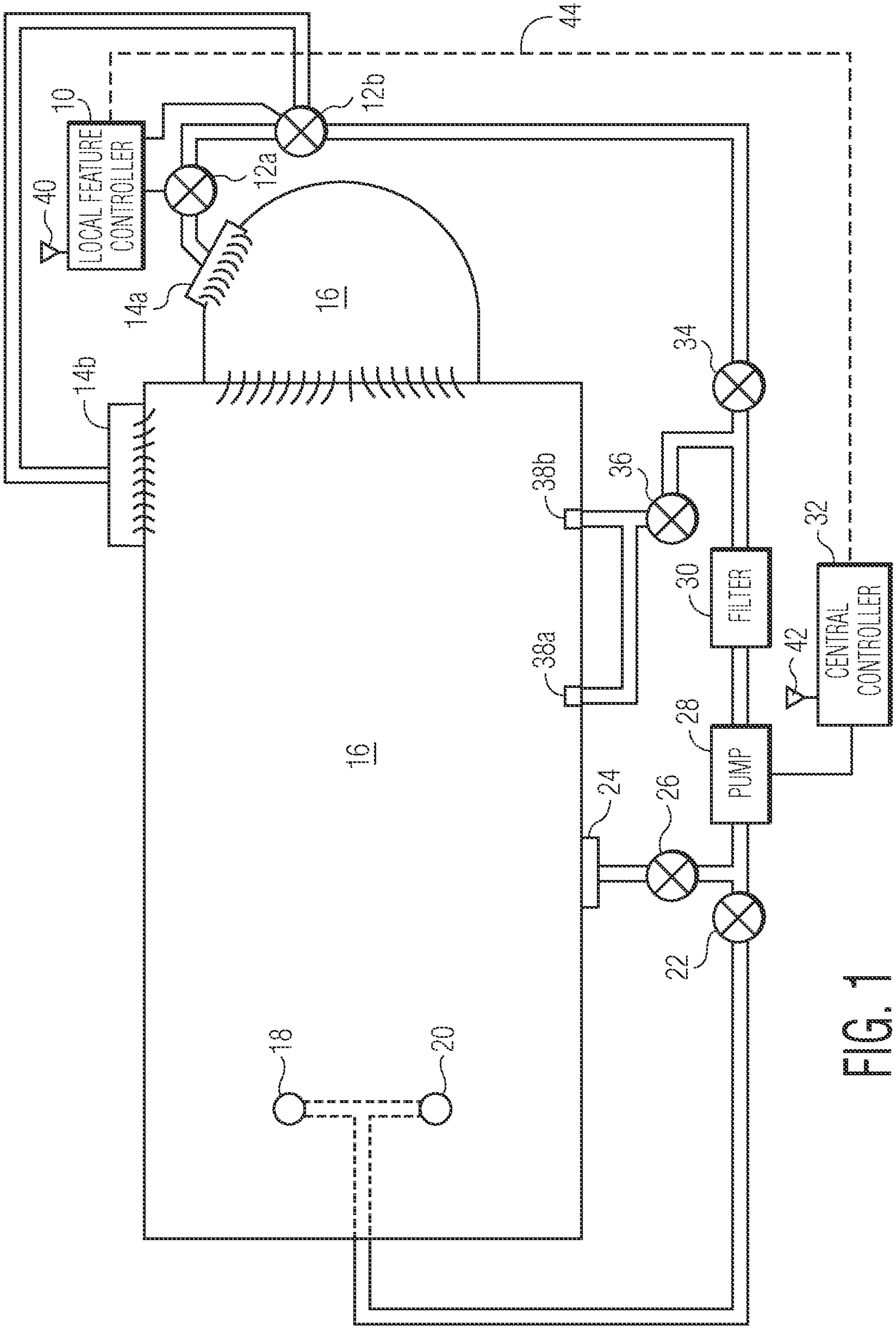
FIG. 1 is a diagram showing the local feature controller of the present disclosure, installed in a pool.

FIG. 1 is a diagram showing the local feature controller 10 of the present disclosure, installed in a pool 16. The controller 10 is installed near a pool feature, such as fountains 14*a*-14*b*, for controlling same. The fountains 14*a*-14*b* form part of the pool 16, and provide a pleasing aesthetic effect. They also form part of the filtration system of the pool 16, which includes main drains 18, 20, drain valve 22, one or more skimmers 24, skimmer valve 26, a pump 28, a filter 30, branch valves 34, 36, and jets 38*a*, 38*b*. Filtered water supplied by the pump 28 and filter 30 is supplied to the fountains 14*a*-14*b*, and is returned to the pool 16 for subsequent filtration. Of course, the arrangement of the filtration system shown in FIG. 1 could be varied as desired, and other components, such as a heater, automatic chlorinator, etc., could be provided. A central controller 32, such as a PRO LOGIC and/or OMNILOGIC pool/spa controller manufactured by Hayward Industries, Inc., could also be provided for controlling the pump 28 and/or other filtration components. The controller 32 could include an antenna 42 and associated wireless transceiver for wirelessly communicating with additional equipment, such as handheld wireless controllers, etc.

The local feature controller 10 of the present disclosure selectively actuates valves 12*a*, 12*b* for controlling the fountains 14*a*, 14*b*. As will be discussed below, the controller can execute a stored control program for controlling one or more water features to achieve a desired effect or water "show." The controller 10 could also receive and execute water feature control commands which are transmitted to the controller, such as from the central controller 32 or from another source, such as a remote computer system in communication with the controller 10 via the Internet. An antenna 40 and an associated wireless transceiver could be provided in the controller 10 for allowing such communications. Optionally, a hardwired data link 44, such as an Ethernet or RS-422 communications link or a power line data carrier link, could be provided for allowing communication between the local feature controller 10 and the central controller 32.

Figure 2:
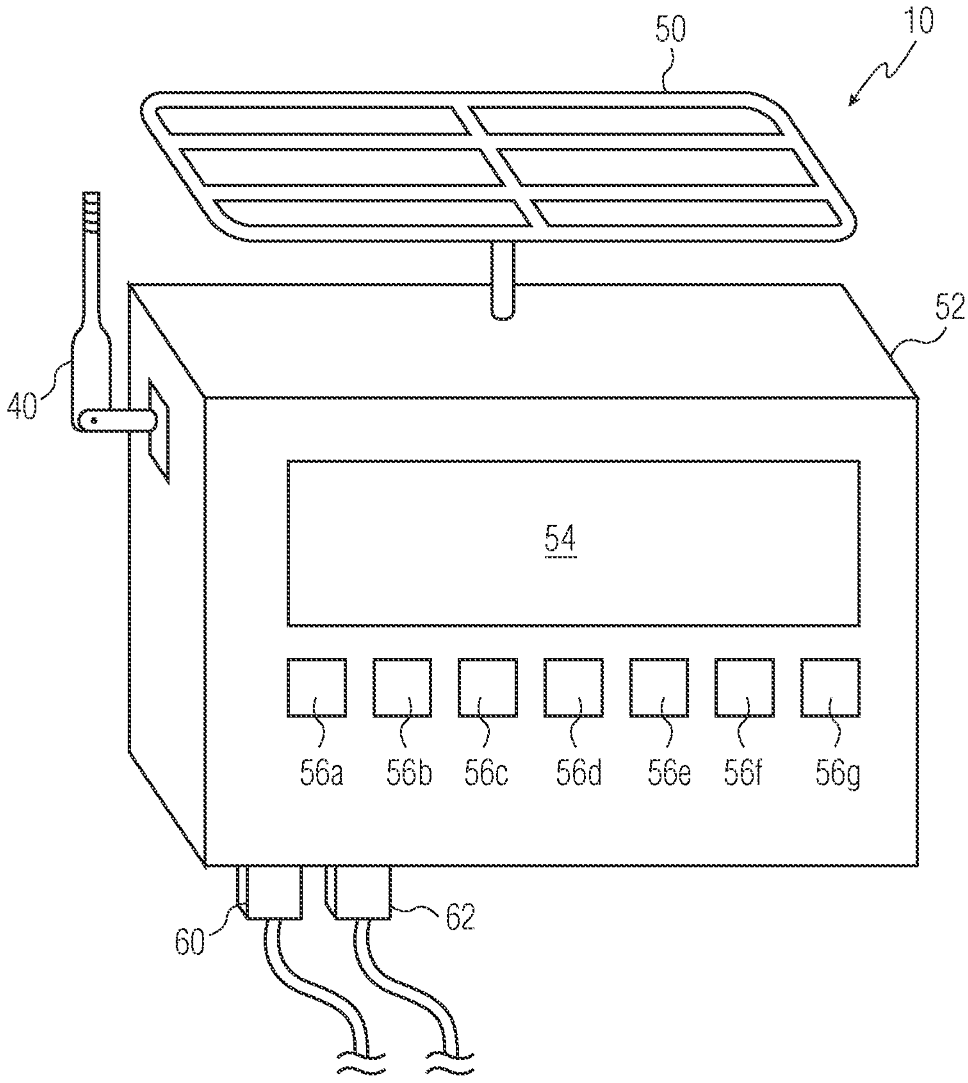
FIG. 2 is perspective view of the local feature controller of FIG. 1.

FIG. 2 is a perspective view of the local feature controller 10 of the present disclosure. The controller 10 includes a solar panel 50 for locally generating power for the controller 10, a weatherproof housing 52, a liquid crystal display (LCD) panel 54, user input keys 56*a*-56*g* (any desired number of keys could be provided), and inputs for receiving plugs 60, 62 for connecting the controller 10 to one or more devices to be controlled, to an external power source, and/or to a hardwired data communications link. It is noted that any number of inputs/outputs could be provided without departing from the spirit or scope of the disclosure for interfacing the controller 10 to any desired number of components to be controlled, power sources, and/or communications links. It is noted that the solar panel 50 need not be attached to the controller housing 52, and it could be positioned at a location to maximize exposure to sunlight. Further, the housing 52 could be provided without the display panel 54 and the user input keys 56*a*-56*g*, and could be buried underground if desired.

The antenna 40 is attached to the side of the controller housing 52. The LCD panel 54 and the user input keys 56*a*-56*g* allow a user to control and monitor various aspects of the controller 10, such as selecting pre-programmed water feature control programs to be executed, inputting user-defined water feature control programs, setting current date and time, specifying one or more water feature activation/deactivation dates and times, viewing diagnostic information and/or error codes, etc. Information could be presented to the user via menus and/or a graphical user interface displayed on the panel 54. Also, the foregoing information could also be remotely supplied to the controller 10 and/or telemetered therefrom, e.g., using the communications link 44 shown in FIG. 1. In such circumstances, the central controller 42 would allow for remote control of the local feature controller 10. Of course, the shape and configuration of the housing 52 could be varied as desired without departing from the spirit or scope of the present disclosure.

Figure 3:
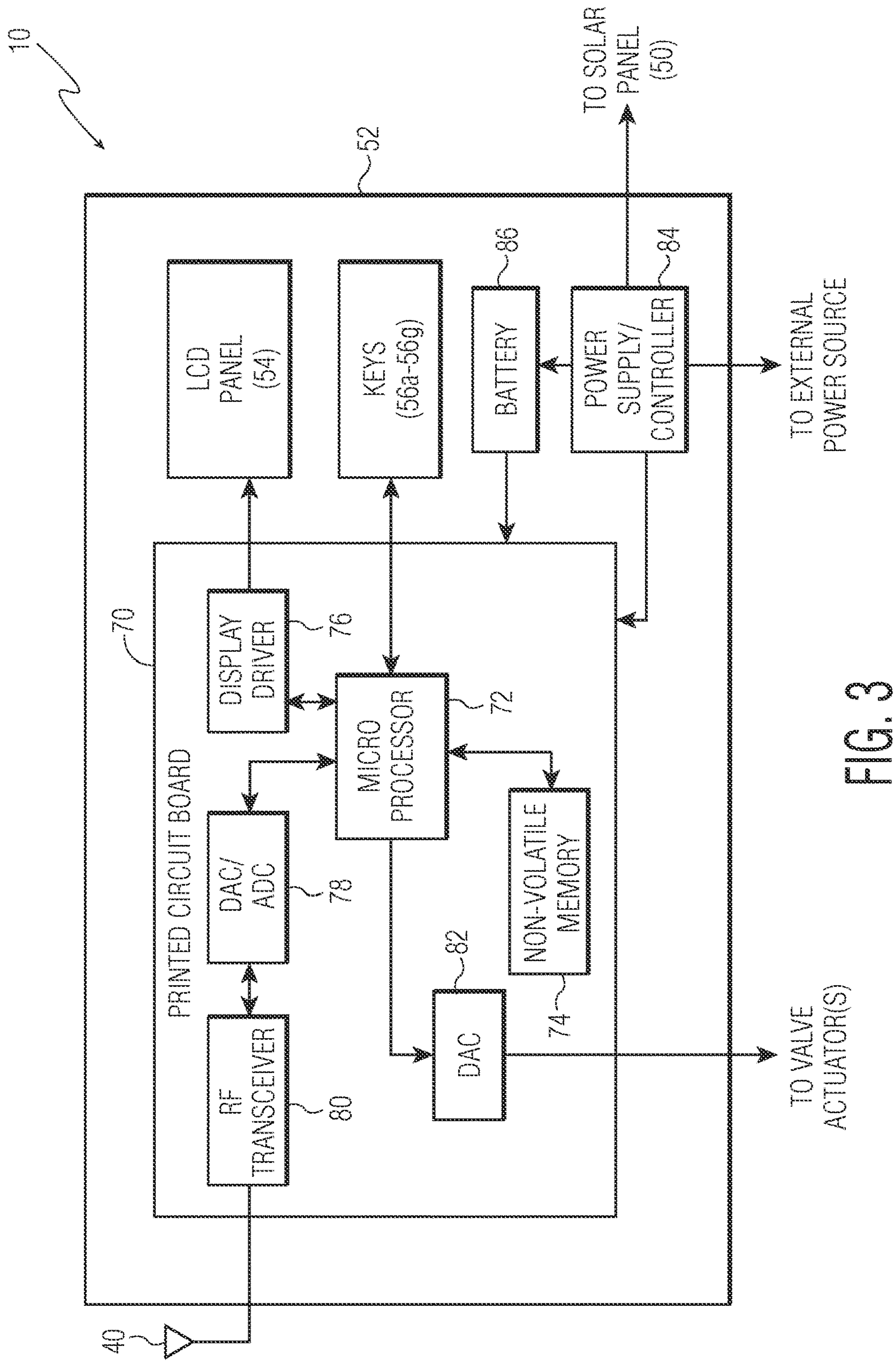
FIG. 3 is a block diagram showing electrical components of the local feature controller of FIG. 1.

FIG. 3 is a block diagram showing electrical components of the local feature controller 10 of the present disclosure. The controller 10 includes a printed circuit board 70 which is connected to the antenna 40, the LCD panel 54, the user input keys 56*a*-56*g*, a power supply/controller 84, and an on-board battery 86. The circuit board 70 includes a microprocessor 72 which provides the functionality disclosed herein, a non-volatile memory 74 for storing water feature control programs and data, a display driver 76 in communication with the microprocessor 72 for driving the LCD panel 54, a digital-to-analog converter (DAC) and analog-to-digital converter (ADC) subsystem 78, an RF transceiver 80 in communication with the antenna 40 for providing wireless communications for the controller 10, and a DAC 82 for providing analog control signals to one or more valve actuators. The power supply/controller 84 receives power from the solar panel 50, which is used to power the controller 10 and to charge the battery 86 so that power is provided to the controller 10 during low or no sunlight conditions. The battery 86 could include a rechargeable nickel cadmium (NiCd), nickel metal hydride (NiMH), lithium ion (LiON), or sealed lead acid battery. The power supply/controller 84 could also be connected to an external power source (e.g., 120 Volts AC, or a generator, discussed below).

Figure 4:
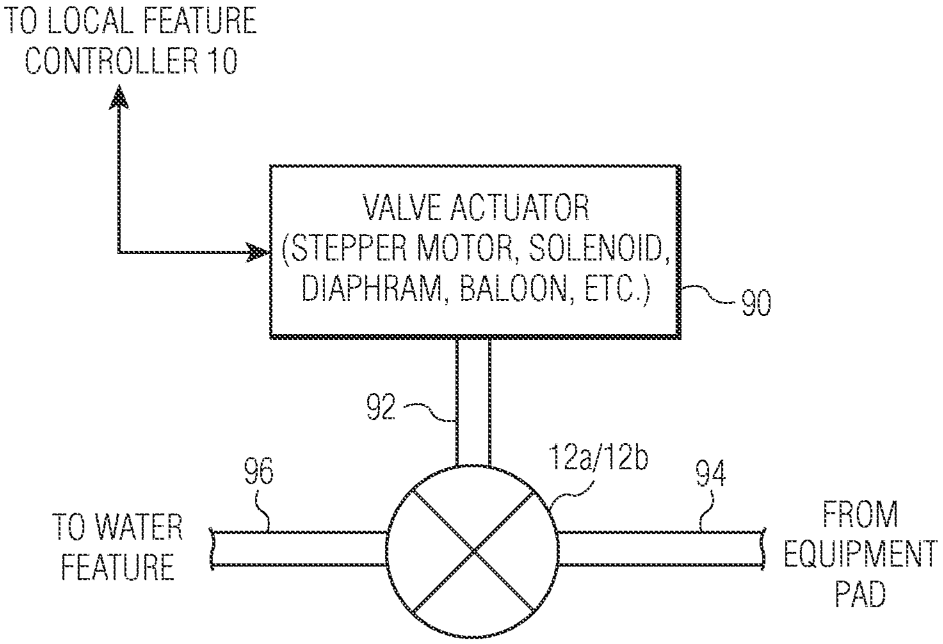
FIG. 4 is a diagram showing a valve actuator capable of being used with the local feature controller of FIG. 1 to control a water feature.

FIG. 4 is a diagram showing a sample valve actuator 90 which could be used with the local feature controller 10 of the present disclosure, e.g., to actuate the valve 12*a*-12*b* of FIG. 1. The valve actuator 90 is connected to the valve 12*a*/12*b* by a shaft 92, and selectively opens or closes the valve 12*a*/12*b* under control of the local feature controller 10. This allows water supplied from the equipment pad (e.g., from the pool/spa filter) via piping 94 to selectively be supplied to a water feature (e.g., the water features 14*a*, 14*b*) via piping 96, so as to achieve a desired aesthetic effect or water show under the control of the local feature controller 10, or to selectively actuate the water features 14*a*, 14*b* at desired times. The valve actuator 90 could include a stepper motor, a solenoid, etc., for selectively actuating the valve 12*a*/12*b*. Moreover, the actuator 90 and valve 12*a*/12*b* could comprise an electrically-controlled diaphragm or balloon valve, such as those valves commonly used to electronically control lawn sprinkler systems.

Figure 5:
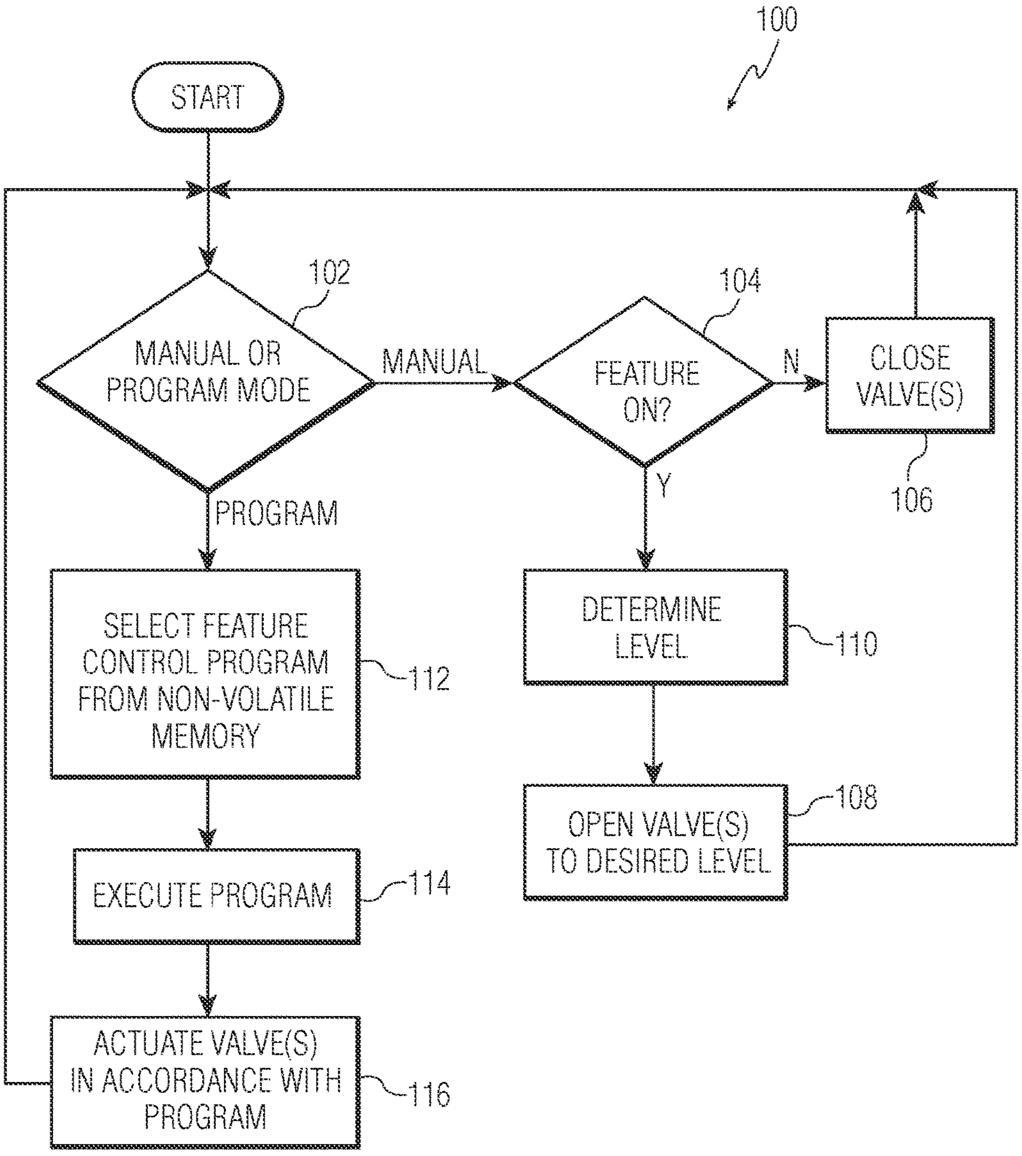
FIG. 5 is a flowchart showing processing steps executed by the local feature controller of FIG. 1.

FIG. 5 is a flowchart showing the processing steps 100 executed by the local feature controller 10 of FIG. 1. The local feature controller 10 begins by first determining the operation mode in step 102 (e.g., manual or program mode). If program mode is selected, the controller accesses the non-volatile memory and allows for the desired feature control program to be selected at step 112. Then, the desired programmed mode executes at step 114. In step 116, execution of the desired program results in the activation of the valve actuator 90 and resulting actuation of the valve(s) in accordance with the program. If manual mode is selected in step 102, the controller determines in step 104 whether the controlled feature is on. If not, the valve(s) are closed in step 106 and control returns to step 102. Otherwise, step 110 occurs, wherein the desired level (setting) for the valve is determined. For example, the level could be 50%, i.e., the valve is opened halfway so that the water feature operates at half its normal power, or any other desired setting. The desired level could be stored in memory and retrieved from the local feature controller, or obtained in real time using the user interface (i.e., screen and keypad) of the local feature controller. Once the desired level is determined, step 108 occurs, wherein the controller actuates the valve actuator to open the valve to the desired level. Control then returns to step 102.

Figure 6:
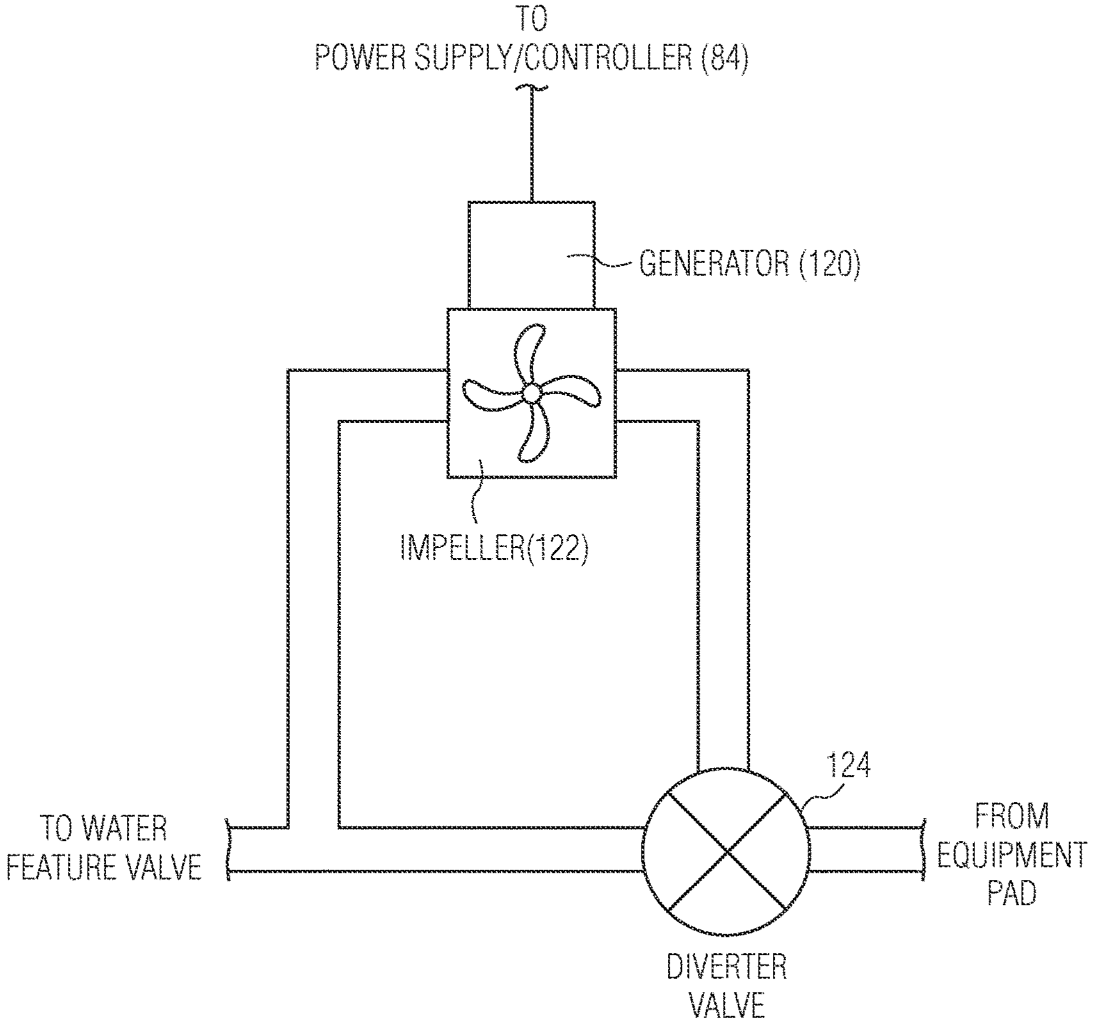
FIG. 6 is diagram showing an electrical generator capable of being used with the local feature controller of FIG. 1 to provide power thereto.

FIG. 6 is a diagram showing an electrical generator capable of being used with the feature controller of FIG. 1 to provide power thereto. The generator 120 is connected to an impeller 122 which is located within the water flow from the equipment pad via a second piping branch. The water flowing from the equipment pad is sent through the standard pool piping where it encounters a diverter valve 124. When the diverter valve 124 is closed, water flows directly to the water feature valve and does not enter the second piping branch to which the impeller 120 is attached. When the diverter valve 124 opened, water runs past the impeller 122 causing it to rotate so that the generator 120 generates electrical power. The power generated by the generator 120 is used to power the local feature controller and/or charge a battery associated with the controller.

Figure 7:
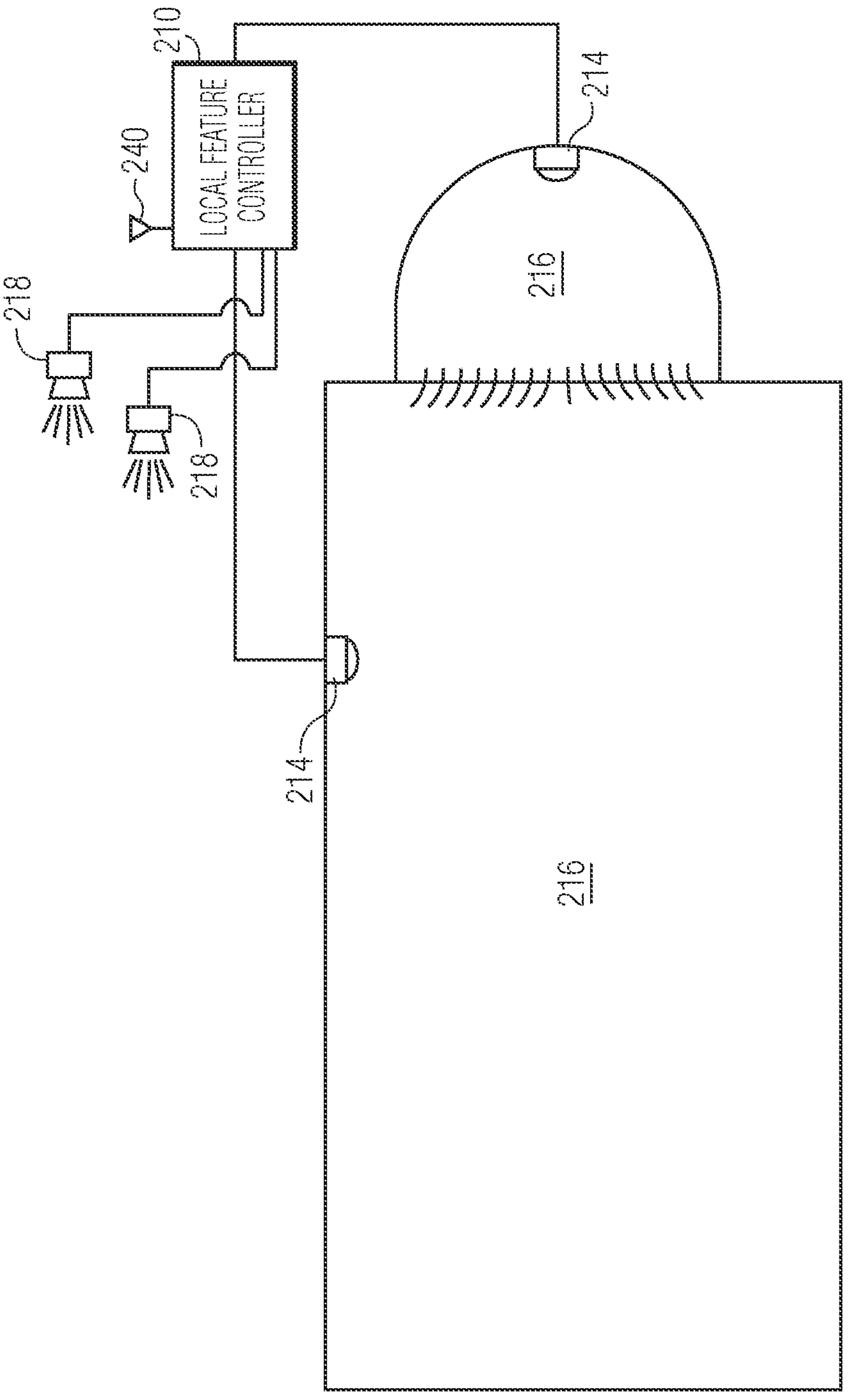
FIG. 7 is a diagram showing another embodiment of the local feature controller of the present disclosure, wherein local control of pool and/or landscaping lights is provided.

FIG. 7 is a diagram showing another embodiment of the local feature controller of the present disclosure, wherein local control of pool and/or landscaping lights is provided. The local feature controller 210 of the present disclosure selectively illuminates the landscape lights 218 and the pool lights 214 of the pool 216. As will be discussed below, the controller can execute a stored control program for controlling one or more lighting features to achieve a desired effect or light "show." The controller 210 could also receive and execute lighting control commands which are transmitted to the controller 210 by another source, such as a remote computer system in communication with the controller 210 via the Internet. An antenna 240 and an associated wireless transceiver could be provided in the controller 210 for allowing such communications, as well as wireless communication with additional equipment, such as handheld wireless controllers, etc.

Figure 8:
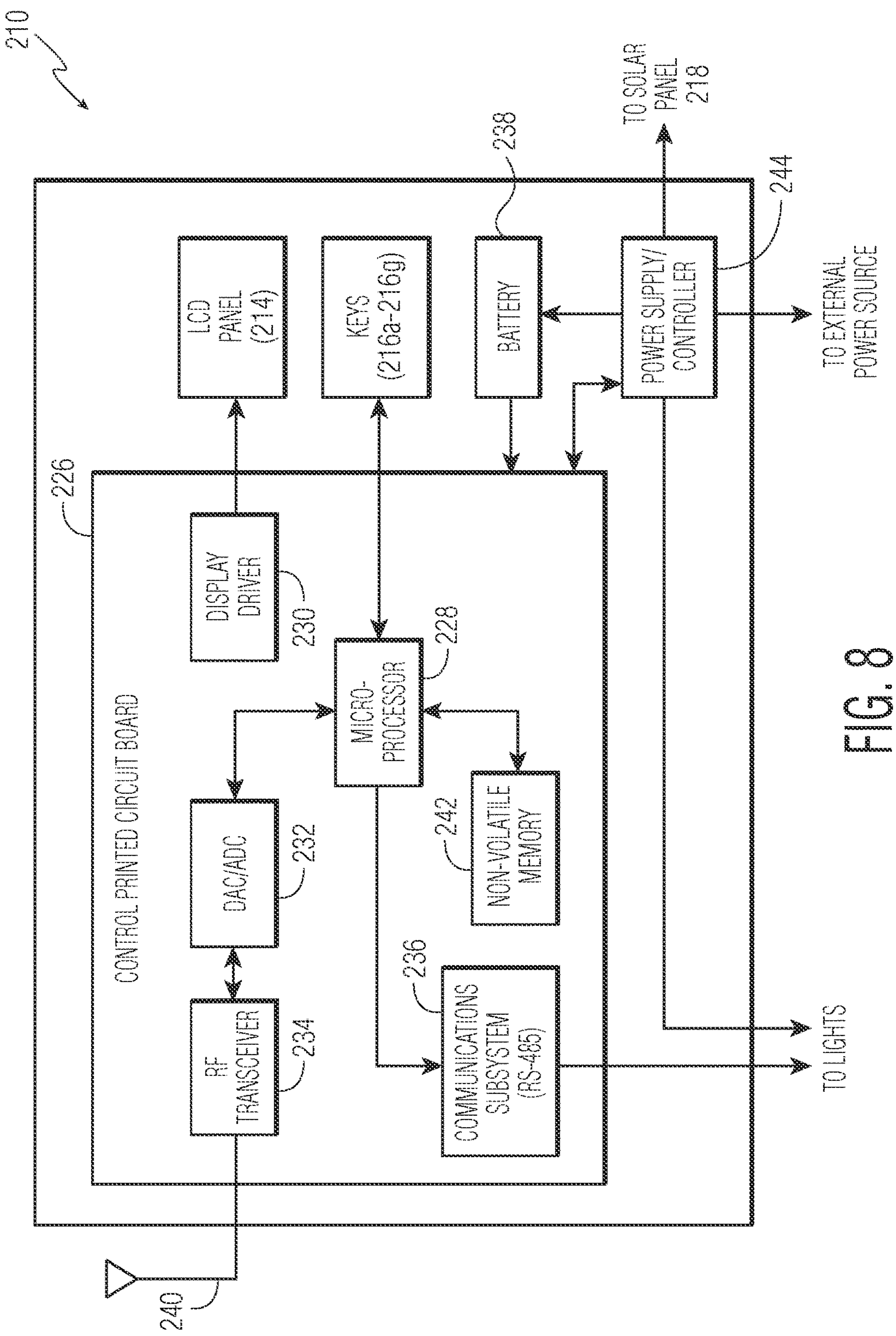
FIG. 8 is a block diagram showing electrical components of the local feature controller of FIG. 7.

FIG. 8 is a block diagram showing electrical components of the local feature controller 210 of the present disclosure. The controller 210 includes a printed circuit board 226 which is connected to an antenna 240, an LCD panel 214, user input keys 216*a*-216*g*, a power supply/controller 244, and an on-board battery 238. The circuit board 226 includes a microprocessor 228 which provides the functionality disclosed herein, a non-volatile memory 242 for storing lighting control programs and data, a display driver 230 in communication with the microprocessor 228 for driving the LCD panel 54, a digital-to-analog converter (DAC) and analog-to-digital converter (ADC) subsystem 232, an RF transceiver 234 in communication with the antenna 240 for providing wireless communications for the controller 210, and a communications subsystem 236, such as an RS-485 serial link, for providing control signals to one or more lights. The power supply/controller 244 can receive power from the solar panel 218, which can be used to power the controller 210 and to charge the battery 238 so that power is provided to the controller 210 during low or no sunlight conditions. The battery 238 could include a rechargeable nickel cadmium (NiCd), nickel metal hydride (NiMH), lithium ion (LiON), or a sealed lead acid battery. The power supply/controller 244 could also be connected to an external power source (e.g., 120 volts AC, a generator, a solar array, etc.).

Figure 9:
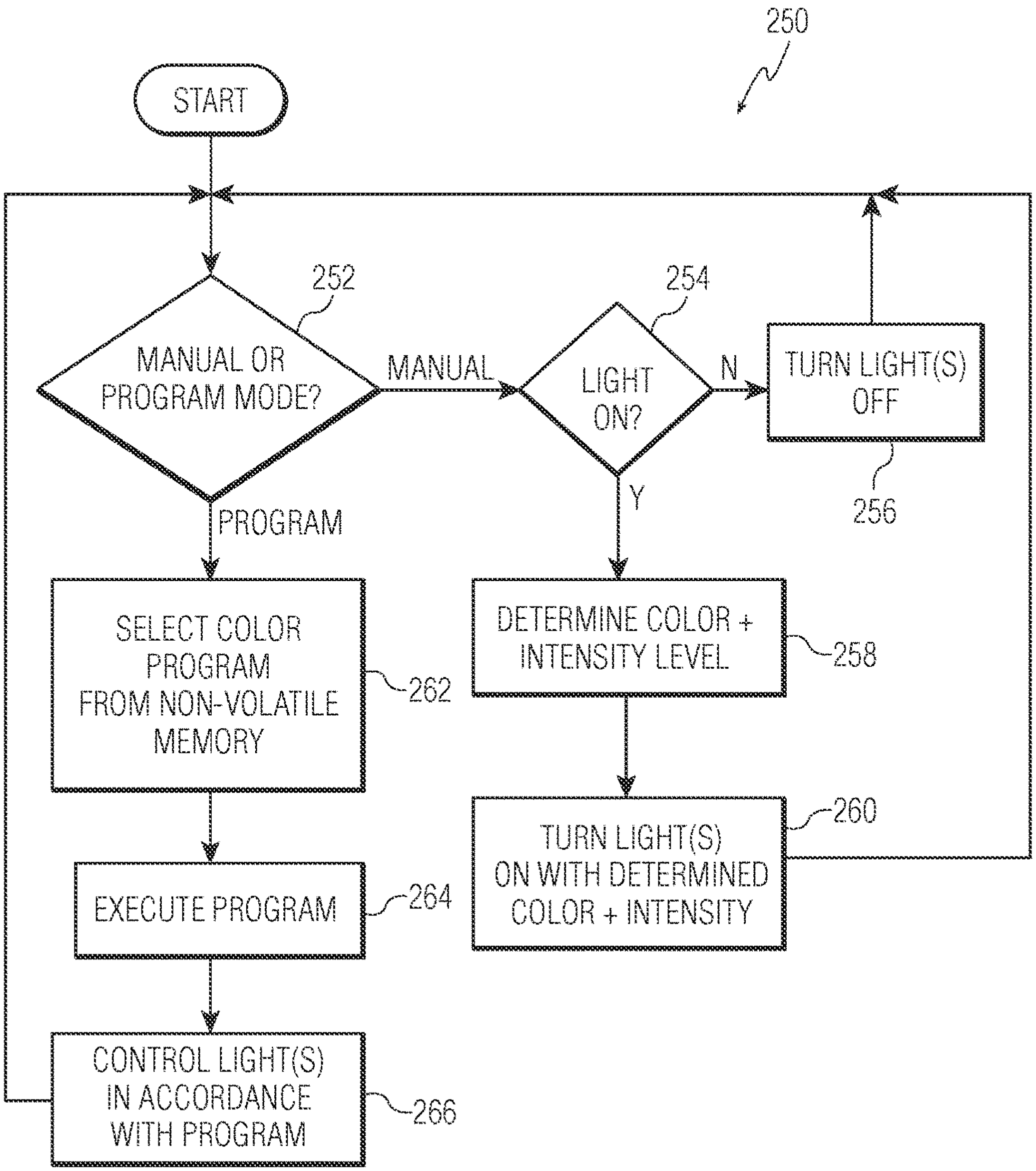
FIG. 9 is a flowchart showing processing steps carried out by the local feature controller of FIG. 7.

FIG. 9 is a flowchart showing processing steps 250 executed by the local feature controller 210 of FIG. 7. The local feature controller 210 begins by first determining the operation mode in step 252 (e.g., manual or program mode). If program mode is selected, the controller accesses non-volatile memory and allows a desired color program to be selected in step 162. The selected program then executes in step 264. In step 266, the program causes the controller to selectively actuate one or more lights connected to the controller (e.g., an underwater light and/or a landscaping light). Control then returns to step 252. If manual mode is selected in step 252, the controller logic will then advance to the "light on?" selection step 254, wherein the controller determines whether the user desires to activate one or more lights. If the user selects no, any currently activated light(s) are turned off in step 256 and control returns to step 252. Otherwise, step 258 occurs wherein the color and/or intensity levels for the light are determined. Such parameters could be specified by the user, using the user interface (display and keypad buttons) of the local feature controller. Then, step 260 occurs, wherein one or more lights are activated using the desired color and intensity levels. Control then returns to step 252.

It is noted that in each embodiment of the local feature controller of the present disclosure, the local feature controller could be remotely controlled by a central controller at the equipment pad of a pool/spa. Also, remote control via the Internet could be provided. For example, the central controller could be in communication with the Internet and with the local feature controller, wherein a remote control command for remotely controlling a water and/or lighting feature could be received by the central controller from a remote destination over the Internet, processed by the central controller, and transmitted to the local feature controller for execution thereby.

Importantly, the local feature controller of the present disclosure significantly reduces time, labor, and costs associated with having to install cables and/or conduits from each feature of the pool/spa back to the central equipment pad. Rather, such cables and/or conduits are only required for short runs between each feature and the local feature controller, and possibly a single fluid conduit connecting the local feature controller to the pool/spa filtration system and/or a single electrical cable interconnecting the local feature controller to the central controller (if wired connectivity between these components is desired).

Having thus described the disclosure in detail, it is to be understood that the foregoing description is not intended to limit the spirit or scope thereof.

What is claimed is:

1. A local controller for a pool or spa water feature, comprising:

a first microprocessor configured to execute a first control program to control at least one pool or spa water feature; and an interface providing for communication between said first microprocessor and a valve actuator connected to a valve for controlling the at least one pool or spa water feature, said interface electronically controlling said valve actuator in response to said first control program executed by said first microprocessor, wherein said local controller is configured to execute control commands transmitted to said local controller from a remote device for controlling the at least one pool or spa water feature, said local controller being in communication with, and receiving the control commands from, the remote device via the Internet; and said local controller is located proximate to the at least one pool or spa water feature such that said local controller is located remote from a central controller located at a pool or spa equipment pad, the central controller being separate from the local controller, having a second microprocessor configured to execute a second control program to control pool or spa equipment other than the valve for controlling the at least one pool or spa water feature, and being in direct electronic communication with the pool or spa equipment being controlled.

2. The local controller of claim 1, further comprising a communications link established between said local controller and said central controller.

3. The local controller of claim 2, wherein the central controller remotely controls the local controller.

4. The local controller of claim 2, wherein the communications link comprises a wired communications link between the central controller and the local controller.

5. The local controller of claim 2, wherein the communications link comprises a wireless communications link between the central controller and the local controller.

6. The local controller of claim 1, further comprising a generator located proximate to the local controller and configured to generate power for the local controller and the valve actuator.

7. The local controller of claim 6, wherein said generator comprises a battery for supplying electrical power to the local controller.

8. The local controller of claim 6, wherein said generator comprises a solar array for supplying electrical power to the local controller.

9. The local controller of claim 6, wherein said generator comprises a turbine and electrical generator for supplying electrical power to the local controller, the turbine being in fluid communication with and powered by a filtration system of a pool or spa.

10. The local controller of claim 1, further comprising a display and at least one button in communication with the first microprocessor for allowing a user to control the local controller.

11. The local controller of claim 1, wherein the local controller is buried underground near a pool or a spa.

12. A local controller for a pool or spa water feature, comprising:

a first microprocessor configured to execute a first control program to control a plurality of pool or spa lighting features; and an interface providing for communication between the first microprocessor and the plurality of pool or spa lighting features, said interface electronically controlling at least one pool or spa lighting feature among the plurality of pool or spa lighting features in response to said first control program executed by said first microprocessor, wherein the local controller is configured to execute control commands transmitted to the local controller from a remote device for controlling the plurality of pool or spa lighting features, the local controller being in communication with, and receiving the control commands from, the remote device via the Internet; and the local controller is located proximate to the plurality of pool or spa lighting features such that said local controller is located remote from a central controller located at a pool or spa equipment pad, the central controller being separate from the local controller, having a second microprocessor configured to execute a second control program to control pool or spa equipment other than the at least one pool or spa lighting feature, and being in direct electronic communication with the pool or spa equipment being controlled.

13. The local controller of claim 12, further comprising a communications link established between said local controller and said central controller.

14. The local controller of claim 13, wherein the central controller remotely controls the local controller.

15. The local controller of claim 13, wherein the communications link comprises a wired communications link between the central controller and the local controller.

16. The local controller of claim 13, wherein the communications link comprises a wireless communications link between the central controller and the local controller.

17. The local controller of claim 12, further comprising a generator located proximate to the local controller and configured to generate power for the local controller and the plurality of pool or spa lighting features.

18. The local controller of claim 17, further comprising a battery for supplying electrical power to the local controller.

19. The local controller of claim 17, further comprising a solar array for supplying electrical power to the local controller.

20. The local controller of claim 17, further comprising a turbine and electrical generator for supplying electrical power to the local controller, the turbine being in fluid communication with and powered by a filtration system of a pool or spa.

21. The local controller of claim 12, further comprising a display and at least one button in communication with the first microprocessor for allowing a user to control the local controller.

22. The local controller of claim 12, wherein the local controller is buried underground near a pool or a spa.

23. The local controller of claim 12, wherein the at least one pool or spa lighting feature comprises an underwater light.

24. The local controller of claim 12, wherein the at least one pool or spa lighting feature comprises a landscaping light associated with a pool or spa.

25. A local controller for a pool or spa water feature, comprising:

a first microprocessor configured to execute a first control program to control a plurality of pool or spa water features; and an interface providing for communication between the first microprocessor and a plurality of valve actuators connected to a plurality of valves for controlling the plurality of pool or spa water features, said interface electronically controlling said valve actuators in response to said first control program executed by said first microprocessor, wherein the local controller is configured to execute control commands transmitted to the local controller from a remote device for controlling the plurality of pool or spa water features, the local controller being in communication with, and receiving the control commands from, the remote device via the Internet; and the local controller is located proximate to the plurality of pool or spa water features such that said local controller is located remote from a central controller located at a pool or spa equipment pad, the central controller being separate from the local controller, and having a second microprocessor configured to execute a second control program to control pool or spa equipment other than the plurality of pool or spa water features, and being in direct electronic communication with the pool or spa equipment being controlled.

26. The local controller of claim 25, further comprising a communications link established between said local controller and said central controller.

27. The local controller of claim 26, wherein the central controller remotely controls the local controller.

28. The local controller of claim 26, wherein the communications link comprises a wired communications link between the central controller and the local controller.

29. The local controller of claim 26, wherein the communications link comprises a wireless communications link between the central controller and the local controller.

30. The local controller of claim 25, further comprising a generator located proximate to the local controller and configured to generate power for the local controller and the plurality of valve actuators.

31. The local controller of claim 30, further comprising a battery for supplying electrical power to the local controller.

32. The local controller of claim 30, further comprising a solar array for supplying electrical power to the local controller.

33. The local controller of claim 30, further comprising a turbine and electrical generator for supplying electrical power to the local controller, the turbine being in fluid communication with and powered by a filtration system of a pool or spa.

34. The local controller of claim 25, further comprising a display and at least one button in communication with the first microprocessor for allowing a user to control the local controller.

35. The local controller of claim 25, wherein the local controller is buried underground near a pool or a spa.

* * * * *